UNITED STATES PATENT OFFICE.

WILHELM WEFERS, OF CREFELD, GERMANY.

PROCESS OF REMOVING FROM LITHOGRAPHIC STONES PREVIOUS DRAWINGS.

SPECIFICATION forming part of Letters Patent No. 538,803, dated May 7, 1895.

Application filed February 25, 1895. Serial No. 539,66 (No specimens.)

*To all whom it may concern:*

Be it known that I, WILHELM WEFERS, a subject of the German Emperor, residing at Crefeld, in the Kingdom of Prussia, German Empire, have invented certain new and useful Improvements in the Process of Removing from Lithographic Stones Previous Drawings or Lettering; and I do declare the following to be a full, clear, and exact description of the invention, such as will enable others skilled in the art to which it appertains to make and use the same.

This present process has for an object to dress lithographic stones after their employ for new work, without grinding off more than absolutely necessary of the surface of the stone, the first condition being that the stone be free of fat and of remnants of the employed acid.

In treating the stone, for the purpose of removing drawings, lettering or other previous work, a solution of eighty to one hundred grams of clarified carbonate of potassa in nine liters of water, is poured over the stone. Then it is ground with pumice-stone and fine sand for a short time. The solution of carbonate of potassa causes the removal of the grease of the old drawing from the stone, while being ground with pumice-stone, and the grease of the old work is so far removed from the surface that remaining parts still held by the stone cannot be detrimental to the next etching. Next the stone is washed off and then treated with a solution of two hundred grams of chloride of iron in five liters of water, which is applied by means of a flat paint brush and slowly spread over the stone for one to two minutes. Thereupon the stone is finely ground without washing off said solution. The carbonate of lime forming the main constituent of the stone, will act on the chloride of iron by developing carbonic acid and by forming a precipitate of oxide of iron which will settle in the shape of a fine powder, serving as a grinding material and effecting a better and quicker finishing of the stone. This treatment imparts to the stone a considerably larger capacity for absorbing fat, as is the case with the usual processes of grinding off with water or other methods.

Other advantages of the new process consist in the economy of time for preparing the stone for new work, thus saving labor, stone and grinding material, and in the greater facility for the printer to operate, and to obtain clear prints, and a more durable plate, which enables him to draw twenty thousand or more perfect proofs. The stone necessitates so little of grinding off, that the old design may still appear raised on the stone, in spite of which the new prints will come off in perfectly good condition, absolutely faultless.

Having described my invention, what I claim, and desire to secure by Letters Patent, is—

A process for making lithographic stones ready for new work, by pouring upon the stone a solution of carbonate of potassa and grinding down the same for a short time with pumice-stone or fine sand, then by washing it, afterward brushing over a solution of chloride of iron in water and finally by grinding the stone without washing off the said solution of chloride of iron.

In testimony whereof I have hereunto signed my name in the presence of the subscribing witnesses.

WILHELM WEFERS.

Witnesses:
R. STEPHAN,
W. POHLE,
FLAVEL SCOTT MINES,
GEORGE GOMPERTZ.